United States Patent [19]

Dingler

[11] Patent Number: 4,813,650

[45] Date of Patent: Mar. 21, 1989

[54] VALVE SEAT RETAINER

[75] Inventor: Hermann P. A. Dingler, Cincinnati, Ohio

[73] Assignee: Xomox Corporation, Cincinnati, Ohio

[21] Appl. No.: 71,796

[22] Filed: Jul. 8, 1987

[51] Int. Cl.$^4$ .............................................. F16K 1/22
[52] U.S. Cl. ..................... 251/360; 251/306; 251/316
[58] Field of Search ............... 251/305, 306, 314, 316, 251/359, 360

[56] References Cited

U.S. PATENT DOCUMENTS

| | | | |
|---|---|---|---|
| 4,560,142 | 12/1985 | Birton | 251/316 X |
| 4,575,046 | 3/1986 | Krause et al. | 251/306 X |
| 4,575,048 | 3/1986 | Bregman | 251/306 X |

*Primary Examiner*—A. Michael Chambers
*Assistant Examiner*—John C. Fox
*Attorney, Agent, or Firm*—Frost & Jacobs

[57] ABSTRACT

A valve body with a tapered annular recess for receiving a correspondingly tapered valve seat retainer forms a valve assembly wherein the retainer may be easily removed for maintenance purposes by field service personnel without special tools. The retainer has a radially extending protruberance on an outer circumferential leg, which leg is inwardly radially flexible as the retainer is axially moved into the annular recess of the valve body. When fully inserted, the protruberance is positioned within an annular cavity spaced from the face of the valve body.

5 Claims, 2 Drawing Sheets

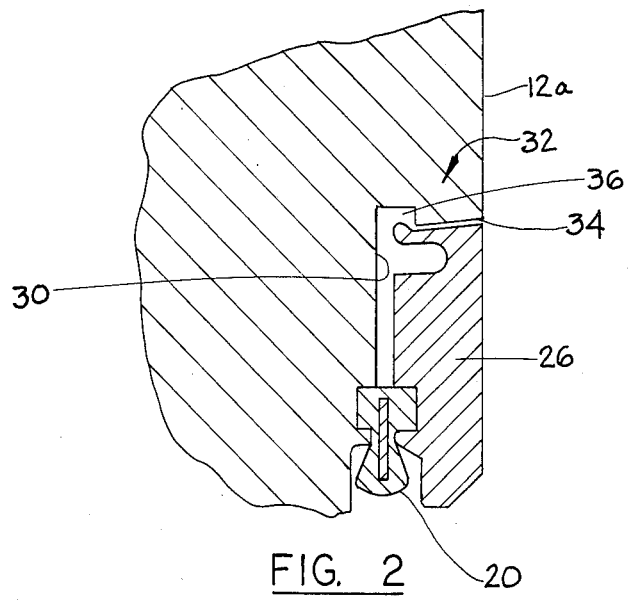
FIG. 2
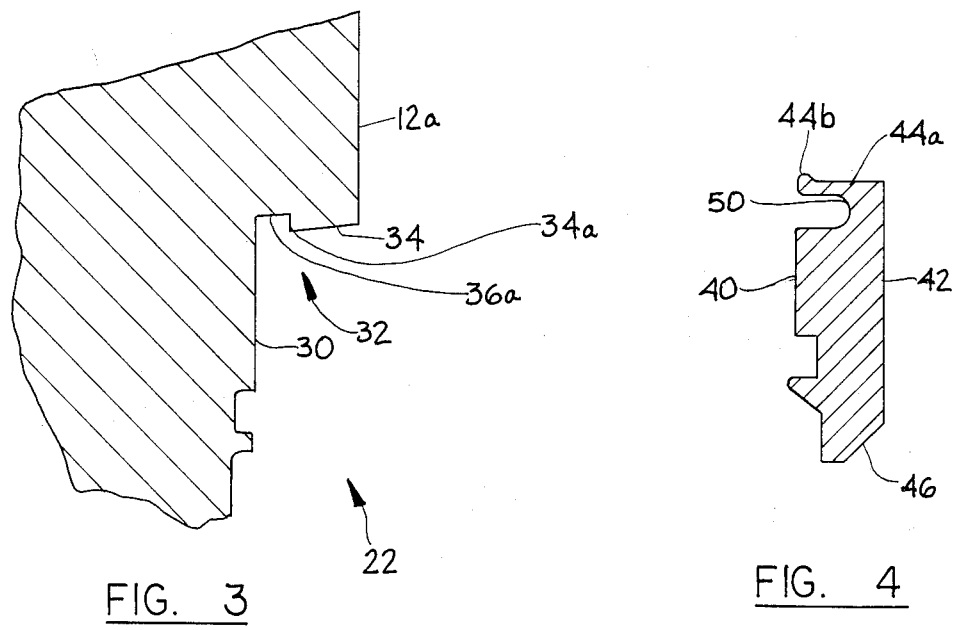
FIG. 3
FIG. 4

VALVE SEAT RETAINER

TECHNICAL FIELD

The invention relates generally to valves and more particularly concerns a valve seat retainer for a valve. The invention will be specifically disclosed in connection with a valve seat retainer which may be readily secured for purposes of assembly, handling, shipping and installation, but which may be easily removed by field service personnel without special tools for maintenance purposes.

BACKGROUND OF THE INVENTION

It is very common in the valve industry to secure a valve seat and a valve body through the agency of a valve seat retainer. One prevalent method of fastening a seat retainer to a valve body is through the use of screws which extend through screw holes in the retainer and are threadably received by bores in the valve body.

In recent years, it has become recognized that voids caused by screw holes in the valve seat retainer may enhance leaking at the valve-gasket interface, and efforts have been made to provide valve seat retainers with fully uninterrupted gasket faces. Furthermore, it has been recognized that many industrial valves are positioned between mating flanges during operation, and that it is necessary only to secure a valve seat retainer to a valve body during assembly, shipping, handling and installation. One prior art approach for holding the valve seat retainer in place on a valve body during these periods is by snap ring assemblies. However, for the most part, these prior art snap ring assemblies have not been fully satisfactory. Among other difficulties, retainers secured by prior art snap ring assemblies are frequently difficult for field service personnel to remove. When hit from the inside by a hammer or pried from a valve body with a screwdriver, such prior art valve seat retainers tend to wedge and bind.

SUMMARY OF THE INVENTION

Accordingly, it is a primary object of the present invention to provide a valve with an easily assemblable seat retainer which holds a valve seat in position during shipping, handling and installation and which is further easily disassembled by field service personnel.

It is another object of the invention to provide a valve seat retainer which can be readily removed without wedging or binding.

Another object of the invention is to provide an easy-to-assemble valve seat retainer with an uninterrupted face.

Additional objects, advantages, and other novel features of the invention will be set forth in part in the description that follows and will become apparent to those skilled in the art upon examination of the following or may be learned by the practice of the invention. The objects and advantages may be realized by means of the instrumentalities and combinations particularly pointed out in the appended claims.

To achieve the foregoing and other objects, and in accordance with the purposes of the present invention as described herein, an improved valve is provided with a seat retainer capable of easy assembly and disassembly. The valve includes a valve body having first and second axial sides with a fluid flow passage extending therebetween. The valve body has an annular recess in the first axial side circumscribing the flow passage. The annular recess includes an axial side wall and a circumferential side wall. The circumferential side wall of the recess includes at least two portions: a frustoconical surface and an annular cavity. The frustoconical surface is proximal to the first axial side of the valve and converges in a direction from the first axial side to the second axial side to form a minimum radial dimension at a location axially spaced from the first axial side. The annular cavity is axially spaced from the first axial side of the valve body and disposed adjacent to the minimal radial dimension of the frustoconical surface. The annular cavity has a radial dimension greater than the minimum radial dimension of the frustoconical surface.

The valve also includes a closure member movable between open and closed positions for controlling fluid flow through the flow passage. A valve seat is disposed in the annular recess about the fluid flow passage for sealingly engaging the valve closure member when the closure member is in the closed position.

The seat retainer is operable to secure the valve seat between the retainer and the axial side wall of the annular recess. The retainer includes first and second axial end surfaces and inner and outer circumferential surfaces. The outer circumferential surface of the retainer is radially flexible and includes a radially outward projecting protruberance adjacent to the first axial end surface of the retainer. An annular relief portion is formed in the first axial end surface adjacent the outer circumferential surface to permit at least a portion of the outer circumferential surface to flex radially inwardly. The protruberance has a radial dimension which is greater than the minimum radial dimension of the frustoconical surface when the outer circumferential surface is in a non-flexed position. When the outer circumferential surface is subjected to radially inward compression during assembly and disassembly, the outer circumferential surface is resiliently flexible to a dimension less than the minimum dimension of the frustoconical surface.

In accordance with another aspect of the invention, the outer circumferential surface of the seat retainer is substantially parallel to the frustoconical surface.

In yet another aspect of the invention, the seat retainer and valve body are substantially coplanar whenever the seat retainer is secured in the annular recess.

Still other objects of the invention will become readily apparent to those skilled in the art from the following description wherein there is shown and described some preferred embodiments to the invention, simply by way of illustration, several of the best modes contemplated for carrying out the invention. As will be realized, the invention is capable of other different embodiments, and its several details are capable of modification of various, obvious aspects, all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of this specification illustrate several aspects of the present invention, and together with the description serve to explain the principles of the invention. In the drawings:

FIG. 2 is a fragmentary cross-sectional view of the valve of FIG. 1 depicting the seat retainer of the present invention;

FIG. 3 is a fragmentary cross-sectional view similar to FIG. 2, but with the seat retainer and valve seat removed for clarity of illustration; and FIG. 4 is a fragmentary view of the seat retainer of FIG. 2.

Figure 1:
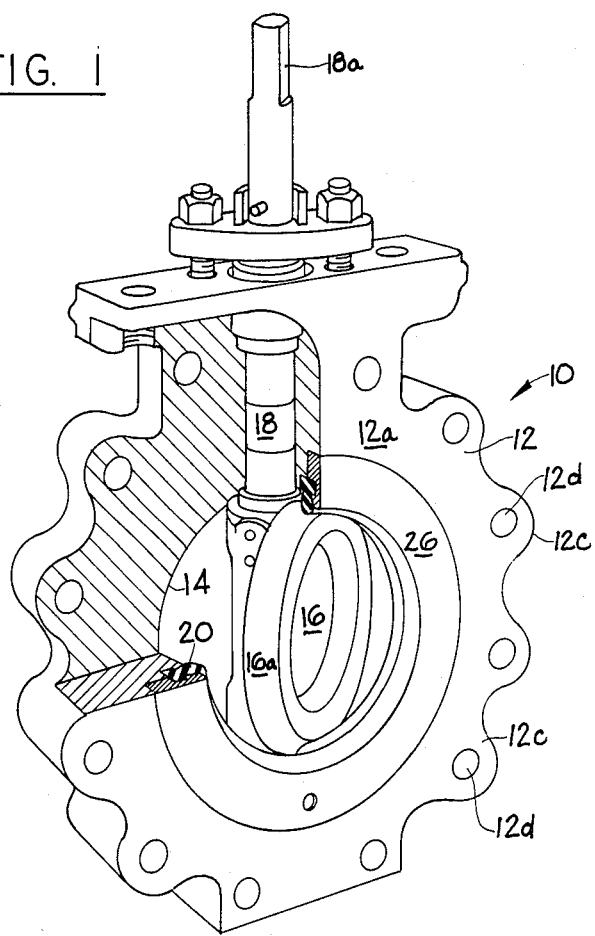
FIG. 1 is an environmental view depicting one type of valve in which the present invention is employed.

Reference will now be made in detail to the present preferred embodiment of the invention, an example of which is illustrated in the accompanying drawings.

DETAILED DESCRIPTION OF THE PREFERRED EMBODIMENT

Referring now to the drawings, FIGS. 1 and 2 show in the invention in the form of a butterfly valve, which valve is generally designated by the numeral 10. Illustrated valve 10 has a lug style body 12 having first and second axial sides 12a, 12b (axial side 12b is not illustrated) with a plurality of spaced radially extending lugs 12c. Each lug 12c has an aperture 12d extending through the body 12 from one axial side 12a to the other (12b). A centrally disposed bore 14 also extends through the body 12 and serves as a fluid flow passage for a fluid media being controlled by the valve 10.

A closure member, specifically illustrated as a disk 16, is pivotally mounted in the bore 14 for selectively opening and closing the fluid flow passage through the body 12 and controlling the flow of fluid media therethrough. The disk 16 is mounted on the outer surface of a shaft 18, which shaft 18 extends radially through the bore 14 and outwardly through the body 12 where it interfaces with an actuator (not shown). The non-illustrated actuator engages flats 18a on the outboard end of shaft 18 and is operative to rotate the shaft 18 which, in turn, pivots the disk 16 between open and closed position in a manner well known in the art.

The disk 16, which is shown in a partially opened position in FIG. 1, has a spherical sealing surface 16a about its periphery. When the disk 16 is moved to a closed position to completely block fluid flow through the bore 14, the sealing surface 16a sealingly contacts an annular seat member 20 extending radially into the bore 14. The seat member 20 is secured in an annular recess 22 and positioned to be in radial alignment with the disk 16 when the disk 16 is in the closed position. The annular recess 22 is formed to circumscribe the fluid flow passage in the first axial side 12a of the body 12. The illustrated seat 20 is a bidirectional axially pliant pressure assisted seat which is disclosed in U.S. Pat. No. 4,289,296 and assigned to the assignee of the present invention. A seat retainer ring 26 secures the seat 20 in the annular recess 22. The seat retainer ring 26 is more clearly depicted in FIGS. 2 and 4. Although not shown in the drawings, the valve 10 is normally installed between two mating pipe flanges, which flanges prevent removal of the valve seat retainer during operation of the valve. A gasket (not shown) is then interposed between the valve seat retainer 26 and axial valve side 12a and pipe flange (not shown). The valve seat retainer of the invention is thus advantageous in that it provides a full uninterrupted face for improved sealing. Also, since the pipe flanges prevent removal of the valve seat retainer whenever the valve 10 is installed between such flanges, it is only necessary to secure the valve seat retainer to the valve body 12 during assembly, shipping, handling and installation.

As shown in FIGS. 2 and 3, the annular recess 22 is defined by an axial side wall 30 with a circumferential side wall 32. In accordance with the invention, the circumferential side wall 32 is, in turn, formed of at least two distinct surfaces, a frustoconical surface 34 and an annular cavity 36. The frustoconical surface 34 converges in a direction from right to left in FIGS. 2 and 3. In other words, the frustoconical surface 34 converges from a maximum radial dimension (measure relative to the axis of bore 14) at the face of the first axial side 12a to a minimum dimension at a location 34a, the location 34a being axially spaced from the first axial side 12a.

In the preferred embodiment, annular cavity 36 is formed by a cylindrical surface 36a disposed axially adjacent to the minimum dimension of the frustoconical surface 34. As apparent from the drawings, the diameter of the annular recess 22 is stepped abruptly at the transition to the annular cavity 36 so as to abruptly increase the radial dimension of the annular cavity 36 relative to the minimum radial dimension of the frustoconical surface 34. However, those skilled in the art will readily appreciate that other profiles of this frustoconical surface—annular cavity transition are possible and may be desirable. The profile of this transition obviously effects the magnitude of force required for inserting and removing the retainer 26 from the annular recess 22.

FIG. 2 diagrammatically depicts the seat retainer 26 securing the seat member 20 to the valve body 12. More specifically, the valve seat member 20 is interposed between the seat member 26 and the axial side wall of the annular recess 22. The retainer 26 cooperates with the axial end wall 30 to compressingly engage the seat member 20 to maintain the seat member 20 in proper position and alignment. For clarity of illustration, the uppermost or outer circumferential surface 44 (see FIG. 4) of the retainer 26 is shown in FIG. 2 with an exaggerated spacing from the frustoconical surface 34.

The details of the seat retainer (26) configuration are most clearly shown in FIGS. 2 and 4. The seat retainer of the preferred embodiment includes first and second axial end surfaces, designated by the numerals 40 and 42, respectively, as well as outer and inner circumferential surfaces 44 and 46. The outer circumferential surface 44 is obliquely oriented with respect to both the axis of bore 14 and the first and second axial end surfaces 40 and 42. The seat retainer 26 thus contains a frustoconical surface 44a for matching the frustoconical surface 34a of the annular recess 22. The retainer surface 44a terminates into a bulbous protuberance 44b adjacent to the first axial end surface 40. The protuberance 44b extends radially outwardly to abruptly increase the radial dimension of the outer circumferential surface 44.

According to the principles of the present invention, the seat retainer 26 has an annular relief portion 50 extending into the first axial end surface 40 adjacent to the outer circumferential surface 44. With this annular relief portion 50, the radially outward portion of the retainer 26, including the bulbous portion 44b and a portion of the surface 44a, form a resilient "leg" which is permitted to flex radially inwardly under the influence of radial compression.

It will be apparent to those skilled in the art from the above description that the seat retainer 26 may be secured in the annular recess 22 by axially advancing the retainer 26 into the body 12. As suggested by the depiction of FIG. 2, the illustrated bulbous protuberance 44b has a radial dimension which is greater than the radial dimension of the frustoconical surface 34. When inserted into the annular recess 22 and advanced axially, the converging frustoconical surface 34 of valve body 12 applies a radially compressive force against the bulbous portion 44b and flexes said protruberance 44b (and adjacent portions of circumferential surface 44a) inwardly. As axial advancement of the retainer 26 continues, the protruberance continues to flex inwardly until the protruberance is advanced beyond the minimum dimension location 34a to the annular cavity 36. At that time, the radial pressure on the protruberance is relieved and the resiliency of the retainer material urges the protruberance 44 radially outwardly into the cavity 36 to secure the retainer 26 in the annular recess 22.

When secured in the FIG. 2 position, the second axial face 42 of the retainer 26 of the illustrated embodiment is substantially coplanar with the first axial side 12a of the valve body 12. Furthermore, the outer circumferential surface 44a of the retainer 26 is substantially parallel to the frustoconical surface 34.

In the preferred embodiment, the diameters of the surfaces 34 and 44 are closely sized, with diameter 34 being slightly larger. Tapering these closely sided circumferential surfaces 34 and 44 by obliquely orienting the surfaces with respect to the axis of the bore 14, virtually eliminates the possibility of accidental removal of the seat retainer 26. At the same time, this aspect of the invention permits easy removal of the seat retainer 26 by field service personnel. In field service, a seat retainer is typically removed by impacting the first axial side 40 with a hammer or other impact tool or by prying the retainer with a screwdriver. Such an application of force is inherently applied at an angle (with respect to the axis of bore 14). By tapering the parallel circumferential surfaces 34, 44 at an oblique angle with respect to the bore axis, as depicted in FIGS. 2-4, the seat retainer 26 can be removed from the recess 22 under the impact of a hammer without wedging.

In summary, numerous benefits have been described which result from employing the concept of the invention. The invention provides a valve seat retainer which is easily secured to a valve body without the necessity of screws and the advantages resulting therefrom. Furthermore, the retainer of the invention is very easily assembled and disassembled, even by field service personnel. Still further, the retainer is readily removed by field service personnel without wedging or binding the retainer, and the retainer is not readily susceptible to accidental removal.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, although the preferred embodiment depicted the invention as used in a butterfly, it may be used with other types of valves, such as ball valves. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A valve having a seat retainer capable of easy assembly and disassembly, comprising:

a. a valve body having first and second axial sides with a fluid flow passage extending therethrough from one axial side to the other, said valve body having an annular recess in the first axial side circumscribing said flow passage, said annular recess including an axial said wall and a circumferential side wall, the circumferential side wall of the recess including:
      i. a frustoconical surface proximal to said first axial side of the valve body, said frustoconical surface converging in a direction from said first axial side to said second axial side to form a minimum radial dimension at a location axially spaced from the first axial side, and
      ii. an annular cavity axially spaced from the first axial side of the valve body and disposed adjacent to the minimum radial dimension of the frustoconical surface, said annular cavity having a radial dimension greater than the minimum radial dimension of the frustoconical surface;
   b. a closure member movable in said valve body between open and closed positions for selectively controlling fluid flow through said fluid flow passage;
   c. a valve seat disposed in said annular recess about said fluid flow passage, said valve seat being sealingly engageable with said valve closure member when said closure member is in the closed position; and
   d. a seat retainer selectively securable in said annular recess, said valve seat being interposed between said seat retainer and the axial side wall of the annular recess, said seat retainer including;
      i. first and second axial end surfaces, said first axial end surface of the retainer being adapted to compressingly engages said valve seat in cooperative relationship with said axial end wall of said annular recess; and
      ii. an outer circumferential surface, said outer circumferential surface of the retainer being radially flexible and including a radially outwardly projecting protruberance adjacent to the first axial end surface of the retainer, the first axial end surface of the retainer having an annular relief portion adjacent to the outer circumferential surface permitting at least a portion of the outer circumferential surface to flex radially inwardly, the protruberance having a radial dimension greater than the minimum radial dimension of the frustoconical surface when the outer circumferential surface is in a non-flexed position but being resiliently flexible to a dimension less than the minimum radial dimension of the frustoconical surface when the outer circumferential surface is subjected to radially inward compression during assembly and disassembly of the seat retainer, whereby the outer circumferential surface of the retainer is flexed radially inwardly as the first axial end surface of the seat retainer is axially advanced into the axial sidewall of the annular recess and the seat retainer is secured to the valve body by positioning the protruberance into the cylindrical cavity.

2. A valve as recited in claim 1 wherein the outer circumferential surface of the seat retainer is substantially parallel to the frustoconical surface of the recess when the seat retainer is secured in the valve body.

3. A valve as recited in claim 1 wherein the second axial side of the retainer and the first axial side of the valve body are each substantially planar and are substantially coplanar when the seat retainer is secured in the annular recess.

4. A valve as recited in claim 1 wherein the protruberance has a bulbous configuration.

5. A valve as recited in claim 1 wherein the radial dimension of the circumferential side wall is abruptly changed at the transition of the frustoconical surface and the annular cavity.

* * * * *